United States Patent [19]

Nordstrom et al.

[11] 4,083,736
[45] Apr. 11, 1978

[54] FILTER MOUNTING APPARATUS

[75] Inventors: Edward R. Nordstrom, Crystal Lake; Roger K. Ufferfilge, Cary, both of Ill.

[73] Assignee: Seaquist Valve Company, Div. of Pittway Corporation, Cary, Ill.

[21] Appl. No.: 775,974

[22] Filed: Mar. 9, 1977

[51] Int. Cl.$^2$ .............................................. B32B 31/20
[52] U.S. Cl. .................... 156/73.1; 156/251; 156/368; 156/524; 156/515; 156/580.1; 228/1 R; 264/23
[58] Field of Search ............ 156/73.1, 73.5, 368, 156/580.1, 363, 514, 515, 251; 264/23; 228/1 R

[56] References Cited

U.S. PATENT DOCUMENTS

| | | | |
|---|---|---|---|
| 3,297,504 | 1/1967 | Brown et al. | 156/73.5 |
| 3,806,386 | 4/1974 | Burke et al. | 156/73.1 |

*Primary Examiner*—Edward G. Whitby
*Attorney, Agent, or Firm*—Stein & Frijouf

[57] ABSTRACT

An apparatus is disclosed for mounting a filter to a valve member which is suitable for use in an aerosol container or the like. The apparatus includes a valve member holder adapted for moving the valve member between a loading position, a securing position and an unloading position. The valve member is loaded on the valve member holder at the loading position. A securing element is mounted relative to the securing position with the filter being interposed between the valve member and the securing element. The securing element secures the filter to the valve member by sonic or ultrasonic welding. The valve member and the secured filter is unloaded from the valve member holder at the unloading position. The invention may include a sensor for sensing the presence of the filter secured to the valve member for testing each of the filtered valve members.

19 Claims, 8 Drawing Figures

FILTER MOUNTING APPARATUS

The foregoing abstract is merely a resume of one general application, is not a complete discussion of all principles of operation or applications, and is not to be construed as a limitation on the scope of the claimed subject matter.

BACKGROUND OF THE INVENTION

1. Field of the Invention

This invention relates to an apparatus for securing and more particularly to an apparatus for securing a filter to a valve member.

2. Description of the Prior Art

Aerosol containers have found wide spread use in the art and are used for dispensing a large variety of products. Among the more recent aerosol products are the powder products which are dispensed from the aerosol container in a substantially dry form. These powder products consists of small powder particles which are forced through an internal orifice in the valve member and/or valve button by a propellant inside the container. Unfortunately, the distribution of particle size of the powder particles cannot be economically controlled and accordingly, many of the larger powder particles clog the internal orifice of the valve member or valve button. Many valve members and valve buttons are equipped with filters for filtering the large particles from the internal orifice within the valve member or valve button to prevent clogging. These filters are generally secured to the valve member by adhesive means. Adhesive securing is both time consuming and expensive in view of the fact that many manufacturers require testing of all aerosol valve products. The prior art has failed to provide an apparatus for mounting a filter to a valve member which is reliable, inexpensive, and adapted for enabling testing of all of the valve members.

Therefore it is an object of this invention to provide an apparatus which overcomes the aforementioned inadequacies of the prior art devices and provides an improvement which is a significant contribution to the advancement of the pertinent art.

Another object of this invention is to provide an apparatus for mounting a filter to a valve member comprising a valve member holder, securing means and means for interposing the filter between the valve member and the securing means for securing the filter to the valve member upon activation of the securing means.

Another object of this invention is to provide an apparatus for mounting a filter to a valve member including storage means for storing a plurality of valve members with singulator means arranging the plurality of valve members in a single file and orienting means for arranging the valve members in a preferred orientation for loading on the valve member holder.

Another object of this invention is to provide an apparatus for mounting a filter to a valve member including welding means for welding the filter to the valve member and concomitantly severing the portion of the filter secured to the valve member from the remainder of the filter.

Another object of this invention is to provide an apparatus for mounting a filter to a valve member including sonic or ultrasonic welding means for welding a portion of a filter web to the valve member thereby leaving an aperture in the filter web and including sensor means for sensing the presence of the aperture in the filter web to determine whether the filter has been secured to the valve member.

Other objects and a fuller understanding of this invention may be had by referring to the summary of the invention, the description and the claims, taken in conjunction with the accompanying drawings.

SUMMARY OF THE INVENTION

The invention may be incorporated into an apparatus for mounting a filter to a valve member comprising a valve member holder adapted for moving the valve member between a loading position, a securing position and an unloading position. Means are provided for loading the valve member on the valve member holder at the loading position. Securing means including a securing element is mounted relative to the securing position with the filter being interposed between the valve member and the securing element. Means are provided for activating the securing means for securing the filter to the valve member enabling the valve member and the secured filter to be unloaded from the valve member holder at the unloading position.

The valve member holder may comprise a substantially disc shaped member having a plurality of slots each adapted to receive a valve member. The disc shaped member may be mounted for rotational movement about a substantially vertical axis enabling movement of the valve member between the loading, securing and unloading positions. The invention may include storage means for storing a plurality of valve members with singulator means arranging the plurality of valve members in a single file. Orienting means may be provided for arranging the valve members in a preferred orientation for loading on the valve member holder.

The filter may be in the form of a filter screen web extending cross the securing element with means for indexing the filter web relative to the securing position upon securing a filter screen to the valve member. The securing means may include sonic or ultrasonic welding means for welding the filter to the valve member and concomitantly severing the portion of the filter web secured to the valve member from the remainder of the filter web. The valve member may include a portion thereof having a perimeter established about an internal orifice in the valve member with the securing means having a securing element configured for cooperation with the perimeter of the valve member to fuse the filter to the valve member about the perimeter thereof. The severed portion in the filter web leaves an aperture in the filter web indicating that the filter had been properly secured to the valve member. Sensor means may be provided for sensing the presence of the aperture to determine whether the filter has been secured to the valve member. Reject means may be connected to the sensor means for rejecting a valve member from the unloading portion upon the sensor detecting the absence of an aperture in the filter web. The apparatus is capable of testing all of the valve members produced by the apparatus.

Pressure sensing means may be connected between the securing element and the activation means for activating the securing element only upon a preestablished pressure existing between the securing element and the valve member. After the preestablished pressure has been achieved, high frequency vibration may be connected to the securing element for welding the filter to the valve member.

The invention may also be incorporated into the method of securing a filter to a valve member comprising the steps of holding the valve member by a valve member holder. The method includes placing the filter against the valve member by relative movement between the filter and the valve member. Vibration is then established in proximity to the filter and the valve member to fuse the filter to the valve member. The step of establishing vibration may include welding the filter to the valve member by sonic or ultrasonic welding.

The method may include the steps of arranging a plurality of valve members in a single file and orienting the plurality of valve members in a preferred orientation. The oriented valve members are then conveyed for holding of the valve member in the remaining steps of the process. The step of placing the filter against the valve member may include indexing a filter web relative to the valve member and sensing an aperture formed in the filter web as a result of securing of the filter to the valve member.

This invention accordingly comprises an apparatus and a method possessing the features, properties and the relation of elements, and steps which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION

Figure 1:
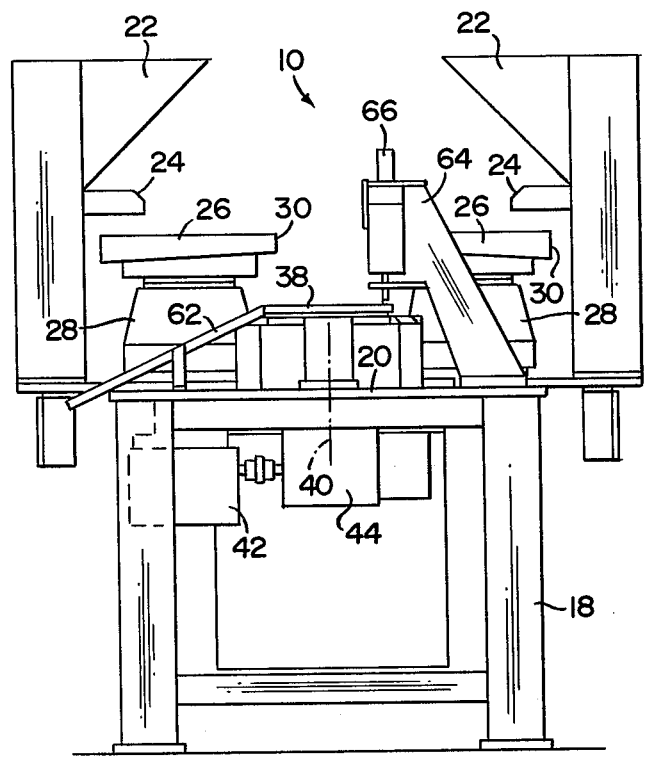
FIG. 1 is a side elevational view of an apparatus for mounting a filter to a valve member incorporating the instant invention.
Figure 2:
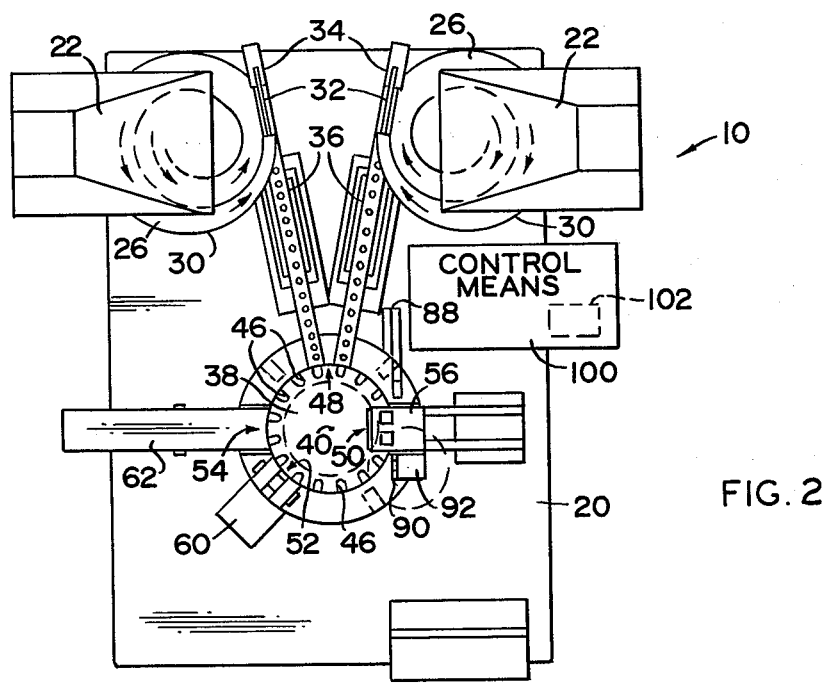
FIG. 2 is a top view of the apparatus shown in FIG. 1.
Figure 8:
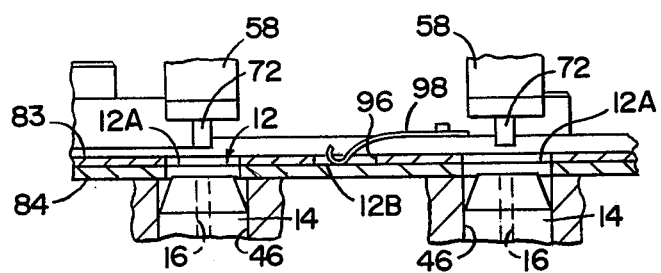
FIG. 8 is a magnified view of the securing means shown in FIG. 3 illustrating sensor means for testing the valve members.

FIGS. 1-8 show various views of an apparatus 10 for mounting a filter shown as a filter screen web 12 in FIG. 8 to a valve member 14. The filter screen web 12 is shown as a plastic screen with the valve member 14 being shown as a unitary plastic member having an orifice 16 for directing powder products therethrough. A circular portion 12A of the filter web 12 is secured relative to orifice to filter particles prior to movement through orifice 16. The structure shown in FIGS. 1-8 comprises a stand 18 supporting a substantially horizontal surface 20 for receiving various components of the invention. Storage means shown as hoppers 22 have chutes 24 for storing and transferring a plurality of valve members to singulator means 26. The singulator means 26 comprises a vibratory base unit 28 connected to a generally helical ramp singulator 30. Vibration of the vibratory base unit 28 causes vibration of the ramp singulator 30 to align the valve members in single file and move in a direction indicated by the arrows.

The output of the ramp singulator 30 is connected to an orienting means 32 comprising an orienting section 34 and a storage section 36. The orienting section 34 arranges the valve members 14 in a preferred orientation to be temporarily stored in the storing section 36 in a single oriented file.

The apparatus 10 includes valve member holding means shown as the substantially disc shaped member 38 mounted for rotational movement about a substantially vertical axis 40 by motor means 42 through a gear box 44. Gear box 44 is capable of changing rotational movement to an indexing movement by means well known in the art. The disc shaped member 38 includes a plurality of slots 46 adapted to receive the valve member 14 from the storing section 36 of the orienting means 32. Rotation of the disc shaped member 38 moves the valve members 14 from a loading position 48 to a securing position 50, through a reject position 52 to an unloading position 54. Securing means 56 having a securing element 58 is established adjacent the securing position 50 whereas a rejector 60 is established adjacent the rejecting position 52. An output chute 62 is established adjacent the unloading position 54 for receiving the completed valve member filter units. In this embodiment, it should be understood that the securing means 56 includes plural securing elements to process two completed valve member filter units at each stage of the operation. Accordingly, plural singulators and orientors and the like are shown in this embodiment.

Figure 3:
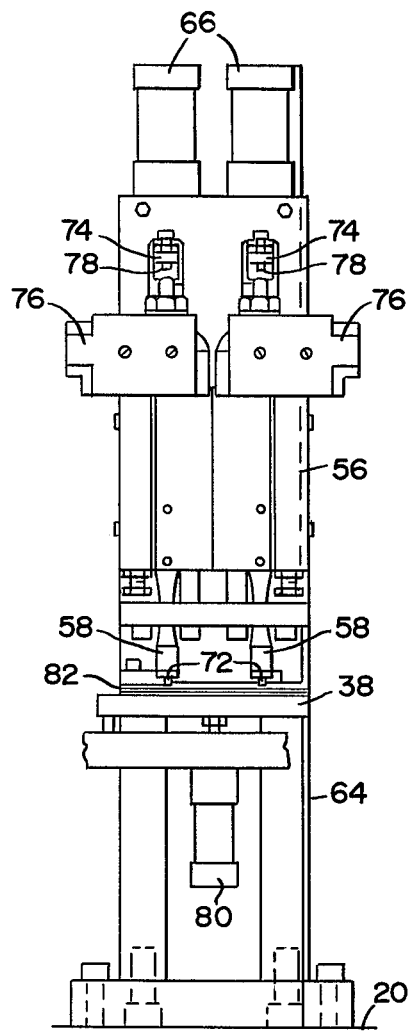
FIG. 3 is a front elevational view of the securing means shown in FIGS. 1 and 2.
Figure 4:
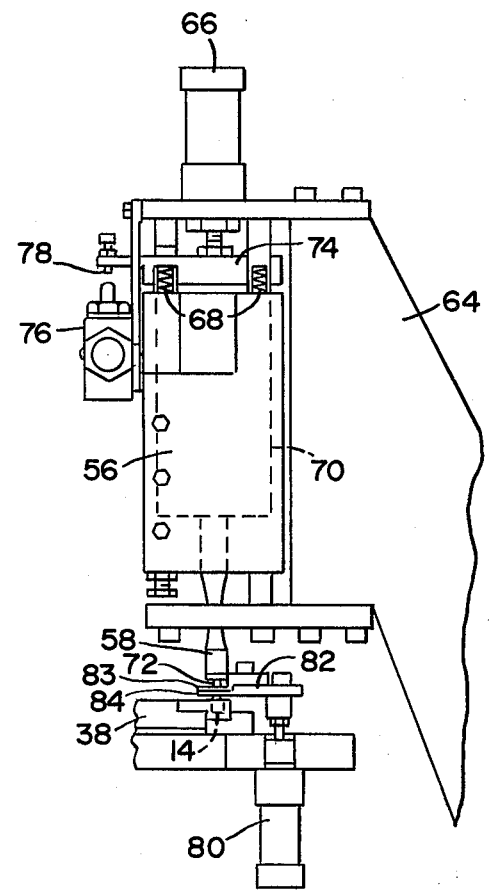
FIG. 4 is a partial side elevational view of the securing means shown in FIG. 3.

FIGS. 3 and 4 show in greater detail the securing means 56 having a frame 64 for mounting relative to the horizontal surface 20. In this embodiment, the securing element 58 is movably mounted relative to the disc shaped member 38 by a air cylinder 66 operating through pressure sensing means 68 shown as a spring which contacts the securing element 58. The securing element 58 includes vibratory means 70 for vibrating a tip portion 72 at a sonic or ultrasonic frequency. The invention has been found to effectively operate at a frequency from 20 or 40 KHz. An activation bar 74 moves in accordance with the action of air cylinder 66 to trigger a limit switch 76 by activation screw 78.

A second air cylinder 80 controls the level of a web holder 82 comprising a first and a second web element 83 and 84. The filter web 12 is interposed between the first and second web elements 83 and 84 and is more clearly shown in FIGS. 5-8. The apparatus 10 in FIG. 2 includes a supply reel 88 and a receiver reel 90 which receiver reel is driven by means 92 synchronized with gear box 44 in FIG. 1 by means not shown. It is understood that such synchronization may be accomplished by mechanical or electrical means. The supply and receiver reels 88 and 90 retain the filter web 12 and index the web upon rotation of the valve member holder 38 after securing a filter web to the valve members.

Figure 5:
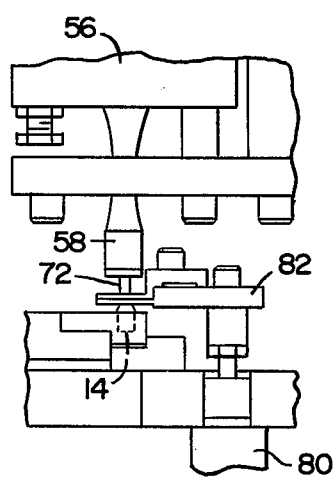
FIG. 5 is a magnified partial view of the securing means shown in FIG. 4 illustrating a first position of operation.

The valve members 14 are loaded into slots 46 of the valve member holder 38 at the loading position 48. The valve member holder 38 is then indexed into the securing position 50 to begin the securing sequence shown in FIGS. 5-7. FIG. 5 illustrates the valve member 14 being aligned with the tip 72 and with the filter web 12 interposed therebetween.

Figure 6:
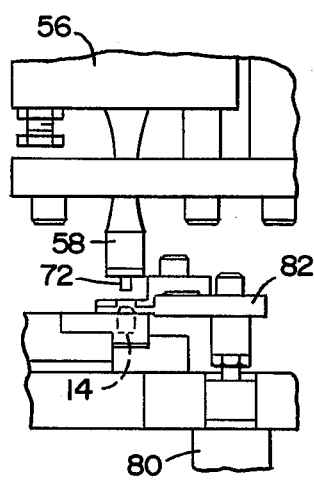
FIG. 6 is a magnified partial view of the securing means shown in FIG. 4 illustrating a second position of operation.
Figure 7:
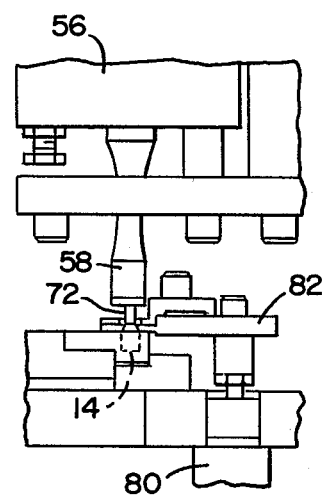
FIG. 7 is a magnified partial view of the securing means shown in FIG. 4 illustrating a third position of operation.

Activation of air cylinder 80 causes the web holder 82 to move downwardly bringing the filter web 12 into contact with the valve member 14 as shown in FIGS. 6 and 8. Activation of air cylinder 66 causes tip 72 to contact the filter web 12 as shown in FIG. 7. Spring 68 insures that a preestablished pressure is developed between the tip 72 and the valve member 14 prior to screw 78 acting on limit switch 76. Screw 78 trips limit switch 76 to activate the vibratory means 70 to vibrate tip 72 thereby sonically welding the filter 12 to the valve member 14. As most clearly shown in FIG. 8, tip 72 is of a diameter greater than the diameter of internal orifice 16. Accordingly, a portion 12A of the filter web 12 commensurate with the diameter of tip 72 is sonically welded to valve member 14 over orifice 16. The filter web is welded about the perimeter of orifice 16 in accordance with the diameter of tip 72. The welded portion of the filter web 12 leaves an aperture in the remaining portion of the filter web 12 which may be used for testing purposes.

Air cylinders 66 and 80 are then deactivated returning the tip 72 and web holder 82 into the position shown in FIG. 4. The valve member holder 38 is then indexed to the reject position 52. Concomitantly therewith, the filter web 12 is indexed such that the aperture 12B remaining in the filter web 12 appears within an aperture 96 in the first web element 83. A sensor 98 shown as a spring biased metallic conductor senses the aperture 12B through contact with the second web element 84. If sensor 98 makes electrical contact with the second web element 84, then the filter 12 has been properly welded to the valve member 14. If an aperture does not appear, the filter 12 has not been properly welded to the valve member 14. The sensor 98 is connected through control means 100 to activate rejector 60 to reject the defective valve members prior to the index to the unloading position 54. Rejection may be accomplished by mechanical, air jet means or the like. Further indexing of the valve member holder 38 results in the tested completed valve members being unloaded into chute 62 at unloading position 54.

The control means 100 is connected for controlling the operation of the entire machine including motor 42, securing means 56, rejector 60 and base units 28. Control means 100 also includes memory means 102 for terminating operation of the apparatus 10 in the event that the sensor means 98 detects a preestablished successive number of absent apertures. Accordingly, if the securing means 56 is not properly operating, then the control means 100 may terminate operation of the apparatus 10 upon the control means 100 detecting for example three successive absent apertures.

The invention also resides in a method of securing the filter to the valve member including the steps of holding the valve member 14 by the valve member holder 38. The filter web 12 is placed against the valve member 14 by action of air cylinder 80. The securing means 56 establishes a vibration in proximity to the filter 12 and a valve member 14 to fuse the filter to the valve member 14. The process may include the steps of arranging the plurality of valve members 14 in single file by the singulator means 26 and orienting the plurality of valve members 14 by orienting means 32. The step of sensing an aperture found in the filter web as shown in FIG. 8.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention.

We claim:

1. An apparatus for mounting a filter to a member, comprising in combination:
   member holding means adapted for moving the member between a loading position, a securing position and an unloading position;
   means for loading the member on said member holding means at said loading position;
   securing means mounted relative to said securing position;
   means for interposing the filter between the member and said securing means;
   means for activating said securing means for securing the filter to the member and severing the portion of the filter secured to the member from the remainder of the filter; and
   means for unloading the member and the secured filter from said member holding means at said unloading position.

2. An apparatus for mounting a filter to a member, comprising in combination:
   member holding means adapted for moving the member between a loading position, a securing position and an unloading position;
   said member holding means being substantially disc-shaped and having a plurality of slots each adapted to receive a member;
   means for mounting said member holding means for rotational movement about a substantially vertical axis;
   means for loading the member on said member holding means at said loading position;
   securing means mounted relative to said securing position;
   means for interposing the filter between the member and said securing means;
   means for activating said securing means for securing the filter to the member; and
   means for unloading the member and the secured filter from said member holding means at said unloading position.

3. An apparatus as set forth in claim 1, wherein said loading means includes storage means for storing a plurality of the members;
   singulating means for arranging the plurality of members in a single file; and
   orienting means for arranging the members in a preferred orientation for loading on the member holding means.

4. An apparatus for mounting a filter to a member, comprising in combination:
   member holding means adapted for moving the member between a loading position, a securing position and an unloading position;
   means for loading the member on said member holding means at said loading position;
   securing means mounted relative to said securing position;
   means for interposing the filter between the member and said securing means;

said means for interposing the filter including means for extending a filter web across said securing means;

means for activating said securing means for securing the filter to the member;

means for indexing the filter web relative to said securing position upon securing a filter screen to a valve member; and means for unloading the member and the secured filter from said member holding means at said unloading position.

5. An apparatus as set forth in claim 1, wherein said securing means includes welding means for welding the filter to the member.

6. An apparatus for mounting a filter to a member, comprising in combination:
member holding means adapted for moving the member between a loading position, a securing position and an unloading position;
means for loading the member on said member holding means at said loading position;
securing means mounted relative to said securing position;
means for interposing the filter between the member and said securing means;
means for activating said securing means for securing the filter to the member;
said securing means including welding means for welding the filter to the member and concomitantly severing the portion of filter secured to the member from the remainder of the filter; and
means for unloading the member and the secured filter from said member holding means at said unloading position.

7. An apparatus for mounting a filter to a member, comprising in combination:
member holding means adapted for moving the member between a loading position, a securing position and an unloading position;
means for loading the member on said member holding means at said loading position;
securing means mounted relative to said securing position;
means for interposing the filter between the member and said securing means;
said securing means including a securing element movably mounted to contact the filter while the filter abuts the member;
means connecting said securing element to receive high frequency vibration for welding the filter to the member;
means for activating said securing means for securing the filter to the member; and
means for unloading the member and the secured filter from said member holding means at said unloading position.

8. An apparatus as set forth in claim 1, wherein the member includes a portion thereof having a perimeter established about an orifice in the member; and
said securing means including a securing element having a configuration cooperable with the perimeter of the member to fuse the filter to the member about the perimeter thereof.

9. An apparatus as set forth in claim 1, wherein said securing means includes sonic welding means.

10. An apparatus as set forth in claim 1, wherein said securing means includes a first and a second securing element operating in unison for simultaneously securing filters to a first and a second member.

11. An apparatus for mounting a filter to a member, comprising in combination:
member holding means adapted for moving the member between a loading position; a securing position and an unloading position;
means for loading the member on said member holding means at said loading position;
securing means mounted relative to said securing position;
means for interposing the filter between the member and said securing means;
means for activating said securing means for securing the filter to the member;
sensor means for sensing the presence of the filter secured to the valve member; and
means for unloading the member and the secured filter from said member holding means at said unloading position.

12. An apparatus for mounting a filter to a member, comprising in combination:
member holding means adapted for moving the member between a loading position, a securing position and an unloading position;
means for loading the member on said member holding means at said loading position;
securing means mounted relative to said securing position;
means for interposing a filter web between the member and said securing means with the filter web extending across said securing means;
means for activating said securing means for securing the filter to the member;
means for indexing the filter web relative to said securing position upon securing a filter to a member;
said securing means severing the portion of the filter web secured to the member from the remainder of the filter web leaving an aperture in the filter web;
sensor means for sensing the presence of said aperture to determine whether the filter is secured to the member;
reject means connected to said sensor means for rejecting the member from the unloading portion upon said sensor means detecting the absence of an aperture in the filter web; and
means for unloading the member and the secured filter from said member holding means at said unloading position.

13. An apparatus for mounting a filter to a member, comprising in combination:
member holding means adapted for moving the member between a loading position, a securing position and an unloading position;
means for loading the member on said member holding means at said loading position;
securing means mounted relative to said securing position;
means for interposing the filter between the member and said securing means;
said securing means including a securing element;
means for activating said securing means for securing the filter to the member;
pressure sensing means connected between said securing element and said activating means for activating said securing means only upon preestablished pressure existing between said securing element and the member; and means for unloading the member and the secured filter from said member holding means at said unloading position.

14. An apparatus for mounting a filter to a member, comprising in combination:
member holding means adapted for moving the member between a loading position, a securing position and an unloading position;
means for loading the member on said member holding means at said loading position;
securing means mounted relative to said securing position;
means for interposing the filter between the member and said securing means;
one of said interposing means and member holding means being movable for establishing the filter to be in contact with the member prior to activation of said securing means;
means for activating said securing means for securing the filter to the member; and
means for unloading the member and the secured filter from said member holding means at said unloading position.

15. An apparatus as set forth in claim 14, wherein said interposing means is movable for moving the filter into contact with the valve member; and
said securing means including a movable securing element for contacting the filter during filter contact with the valve member.

16. The method of securing a filter to a member, comprising the steps of:
holding the member;
placing the filter against the member by indexing a filter web relative to the member; and
establishing vibration in proximity to the filter and the member to fuse the filter to the member.

17. The method as set forth in claim 16, wherein the step of establishing vibration includes welding the filter to the member by sonic welding.

18. The method as set forth in claim 16, including the steps of arranging a plurality of members in a single file;
orientating the plurality of members in a preferred orientation; and
conveying the plurality of members for holding.

19. The method of securing a filter to a member, comprising the steps of:
holding the member;
placing the filter against the member;
establishing vibration in proximity to the filter and the member to fuse the filter to the member; and
sensing an aperture formed in the filter web caused by the securing of the filter to the member.

* * * * *